United States Patent

[11] 3,614,113

| [72] | Inventor | Duane L. Burk |
| | | Peoria, Ill. |
| [21] | Appl. No. | 16,312 |
| [22] | Filed | Mar. 4, 1970 |
| [45] | Patented | Oct. 19, 1971 |
| [73] | Assignee | Caterpillar Tractor Co. |
| | | Peoria, Ill. |

[54] BOOT-BELLEVILLE SEAL
7 Claims, 3 Drawing Figs.

[52] U.S. Cl. ............................................. 277/94, 305/11
[51] Int. Cl. ....................................... F16j 15/38
[50] Field of Search ............................ 277/81, 94, 95; 305/11

[56] References Cited
UNITED STATES PATENTS

| 2,509,436 | 5/1950 | Isenbarger .................... | 305/11 |
| 3,050,346 | 8/1962 | Simpson et al ............... | 305/11 |
| 3,231,287 | 1/1966 | Stuempfig .................... | 277/94 |
| 3,396,977 | 8/1968 | Iguchi .......................... | 277/94 |

Primary Examiner—Robert I. Smith
Attorney—Fryer, Tjensvold, Feix, Phillips & Lempio ABSTRACT: A track pin seal for the space between pin-connected track elements comprises a resilient boot encompassing the outer diameter of a pair of frustoconical springs positioned back to back and biasing the ends of the boot into sealing engagement with the respective track elements.

PATENTED OCT 19 1971 3,614,113
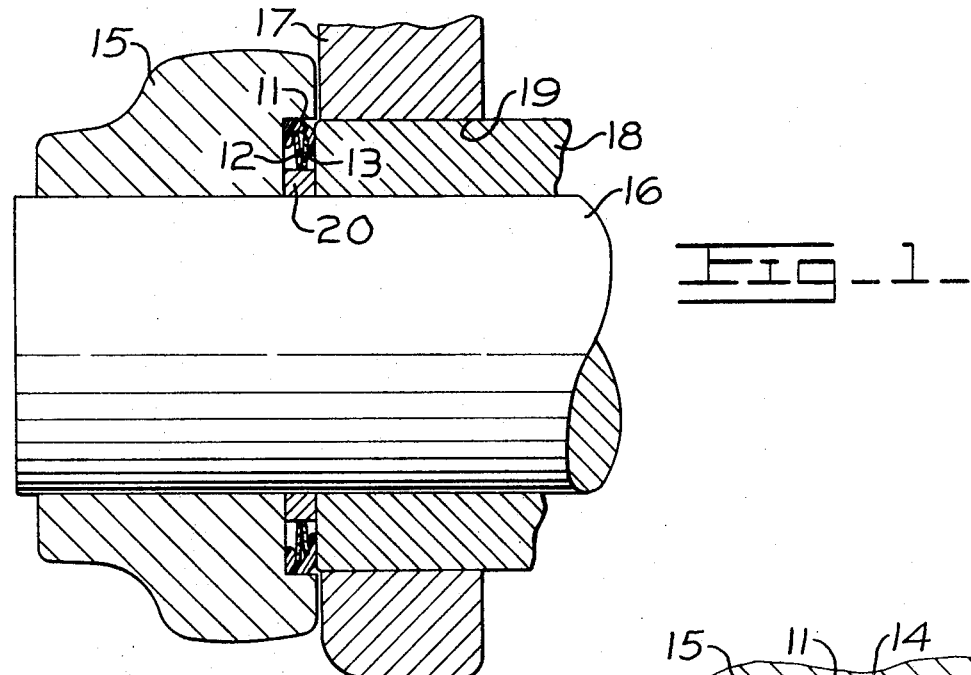
Fig_1_
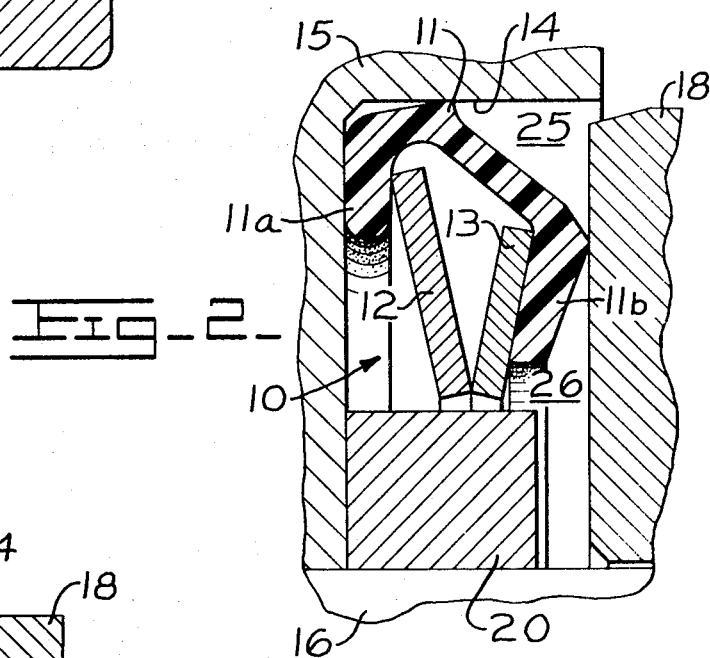
Fig_2_
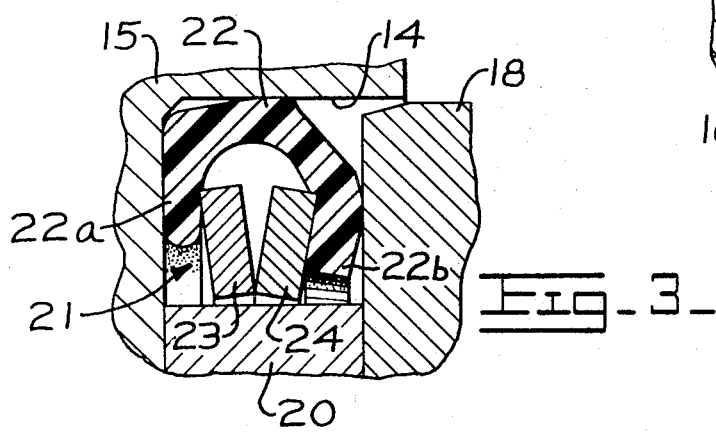
Fig_3_
INVENTOR
DUANE L. BURK
BY
Fryer, Ejnarwald, Feix, Phillips & Lempio
ATTORNEYS

BOOT-BELLEVILLE SEAL

BACKGROUND OF THE INVENTION

Track-type tractors employ a track comprising an endless chain of link members pinned together and strung over a plurality of guide rollers and a drive sprocket. In operation the track is laid down ahead of the tractor as it progresses over an area of the earth's surface. This track mechanism is generally subjected to extremely heavy duty in an extremely abrasive environment. As a result of this heavy-duty use in such an extreme environment, the hinge connections between pairs of track links are subject to rapid wear requiring frequent repair and replacement.

Extensive efforts have been made to provide or develop suitable seals to prevent the entry of abrasive material into joints between the link members. Numerous seals have been developed which have proven somewhat satisfactory in normal temperature environments. These, however, have been found to be unsatisfactory for use in extremely cold climates. Such deficiencies are due in part to a lack of substantial axial resilience of the seal member in cold weather. Lack of such resilience causes a seal to fail to follow rapid axial movement between the link members at the joint and thus the joint leaks. Such seals ideally must have relatively low face load for reduced wear and longer life, a high degree of resilience for a given deflection range, and be relatively axially compact.

SUMMARY OF THE INVENTION

It is the primary object of the present invention to provide a track link seal which overcomes the aforementioned problems with the prior art devices.

It is another object of the present invention to provide a track link seal which is compact and maintains a high degree of axial resilience at low temperatures.

A further object of the present invention is to provide a resilient seal having a relatively low face load and low face load variation for its required deflection range.

In accordance with the present invention a seal is provided which comprises a resilient annular boot which encompass the outer diameter of a pair of frustoconical spring washers positioned back to back. This seal is positioned in an annular recess formed in one of a pair of link members at the abutting face of the pin connection between the members. The frustoconical springs function to bias the ends of the boot into engagement with the surfaces of the two members.

BRIEF DESCRIPTION OF THE DRAWINGS

FIG. 1 is a fragmentary view in section of a portion of a track connection embodying the present invention;

FIG. 2 is an enlarged fragmentary view of a detail of the seal of FIG. 1;

FIG. 3 is an enlarged fragmentary view similar to FIG. 2 of a modified form of the invention.

DESCRIPTION OF THE PREFERRED EMBODIMENTS

Referring now to the drawings and in particular to FIGS. 1 and 2, there is illustrated a seal element 10 embodied in a connection between a pair of members or elements which are pivotally connected together. While the present invention was developed primarily for use in the links in a track mechanism, it is to be understood that other applications are within the scope thereof. This seal means comprises an elastic boot 11 constructed of, for example, an elastomeric material, and having lip portions, 11a and 11b, extending downward and encompassing a pair of frustoconical spring washers 12 and 13, having different outer diameters and positioned in back-to-back engagement. These springs or washers 12 and 13 are generally referred to as Belleville springs and generally, as indicated, have an axial height that is in excess of the thickness. Such springs have a resistance to flattening by means of an axial force. The seal means 10 is illustrated as being in position in an annular recess 14 formed in a member 15 which is connected in a pivotal manner by means of a pin 16 to a second member 17 which is supported on a bushing 18. The bushing 18 is received in bore 19 formed in link 17 and may be, for example, press fit therein. A pilot and abutment sleeve 20 is positioned in bore 14 and serves, for example, as a pilot for springs 12 and 13 as well as abutting means for engagement with bushing 18.

Referring now to FIG. 3, there is illustrated a modified form of the seal means in an environment as described above with like numbers representing like members. The seal means in this embodiment designated by the numeral 21 comprises a boot 22, having lip portions 22a and 22b which encompass the outer diameters of a pair of washers or frustoconical spring members 23 and 24 of substantially identical outer diameters.

An understanding of the present seal apparatus can best be obtained from a comparison of FIGS. 1 and 2 wherein the sleeve member 18 is shown at presumably both ends of its travel axially along pin 16 with respect to the member 15. FIG. 1 for example shows the pin 18 in axial abutment or engagement with the pilot sleeve 20, at which point the spring washers 12 and 13 are shown substantially flat with the ends of boot 11 in engagement with the end wall of annular bore 14 and the end of sleeve 18 respectively.

In FIG. 2, the bushing 18 is shown in its outermost position away from the pilot or abutment sleeve 20 with the end walls of the boot 11 still maintained by virtue of the spring washers 12 and 13 into engagement with the end wall of the bore 14 and with the end of the bushing 18. Thus, one end 11b of seal 11 is maintained into engagement with the end of member 18 at all times and prevents abrasive particles from passing from a space 25 above the seal to a space 26 below the seal where such particles would cause rapid and extensive wear.

From the above description, it can be seen that the seal means of the present invention combines the stable flexibility of light, compact steel springs with the resilience of an elastomeric material to function effectively in an abrasive environment at low temperatures.

What is claimed is:

1. A seal for disposition in an annular recess between a pair of relatively rotatable members, said seal comprising:
   a pair of frustoconical spring washers;
   said washers being in abutting engagement at their inner peripheries; and
   an annular boot encompassing the outer periphery of said spring washers.

2. The seal of claim 1 wherein the outer diameter of one of said washers is less then the outer diameter of the other of said washers.

3. The seal of claim 1 wherein the inner diameter of said boot is less than the outer diameter of said washers.

4. A seal assembly for a pair of relatively rotatable members positioned for relative rotation about the axis of a shaft, said seal assembly comprising:
   an annular recess in one of said members concentric with said shaft;
   a thrust ring positioned in said recess and adapted for axial engagement with the other of said rotatable members;
   a pair of frustoconical spring washers mounted on said thrust ring in said annular recess; and
   a resilient boot encompassing the outer diameter of said washers and engaging the outer diameter of said recess;
   said spring washers biasing the ends of said boot into engagement with the end wall of said annular recess and the other of said rotatable members respectively.

5. The assembly as defined in claim 4 wherein the outer diameter of one of said spring washers is less than the outer diameter of the other of said washers.

6. The assembly as defined in claim 5 wherein the spring washer having the greater diameter is positioned toward the back of said recess.

7. A seal for disposition in an annular recess between a pair of relatively rotatable members, said seal comprising:
   a pair of washers;
   one of said washers being a frustoconical spring;
   said washers being in abutting engagement at their inner diameters; and,
   an annular resilient boot encompassing the outer periphery of said washers.